United States Patent [19]

Sheldon

[11] 4,362,928
[45] Dec. 7, 1982

[54] UNIVERSAL DOCUMENT FORMAT SYSTEM

[75] Inventor: James R. Sheldon, Phoenix, Ariz.

[73] Assignee: Engineered Systems, Inc., Tempe, Ariz.

[21] Appl. No.: 223,982

[22] Filed: Jan. 12, 1981

[51] Int. Cl.³ .............................................. G06K 5/00
[52] U.S. Cl. .................................. 235/375; 235/381; 235/487; 235/494; 235/419
[58] Field of Search ............... 235/381, 487, 494, 419; 340/146.3 WD

[56] References Cited

U.S. PATENT DOCUMENTS

| | | | |
|---|---|---|---|
| 3,763,467 | 10/1973 | Cash | 235/487 X |
| 4,074,853 | 2/1978 | Flint | 235/494 |
| 4,085,313 | 4/1978 | Van Ness | 235/381 |
| 4,127,232 | 11/1978 | Gagliardo | 235/487 |
| 4,149,670 | 4/1979 | Axelrod | 235/494 |

Primary Examiner—Harold I. Pitts
Attorney, Agent, or Firm—LaValle D. Ptak

[57] ABSTRACT

To reduce the number of different software packages required for document controlled systems of the type used in automated fueling systems, automated bank teller systems, and the like, a "format" character is encoded in a preestablished location on the card used to activate the system. Typically, the system activation cards include an identity section having a maximum number of characters in it which may be utilized to perform the identity function. Different system users, however, frequently divide this identity section into different formats of groups of characters separated by "space" characters. Insertion of space characters into the encoded indentification field on the card, however, uses valuable space which otherwise may be required for the full identification functions in the system. By employing a separate format identity character, a wide variety of formats may be possible while using all of the characters possible in the identity field for their chosen function. The system then processes the data in response to the format character in accordance with the decoding of that character to insert the necessary "space" characters into the message process prior to its application to a suitable utilization circuit or device. When this function is implemented into software, a single software program may be universally used with a large number of applications of the system instead of the previous requirement of a different software package for each different message format required by different customers or users.

3 Claims, 3 Drawing Figures

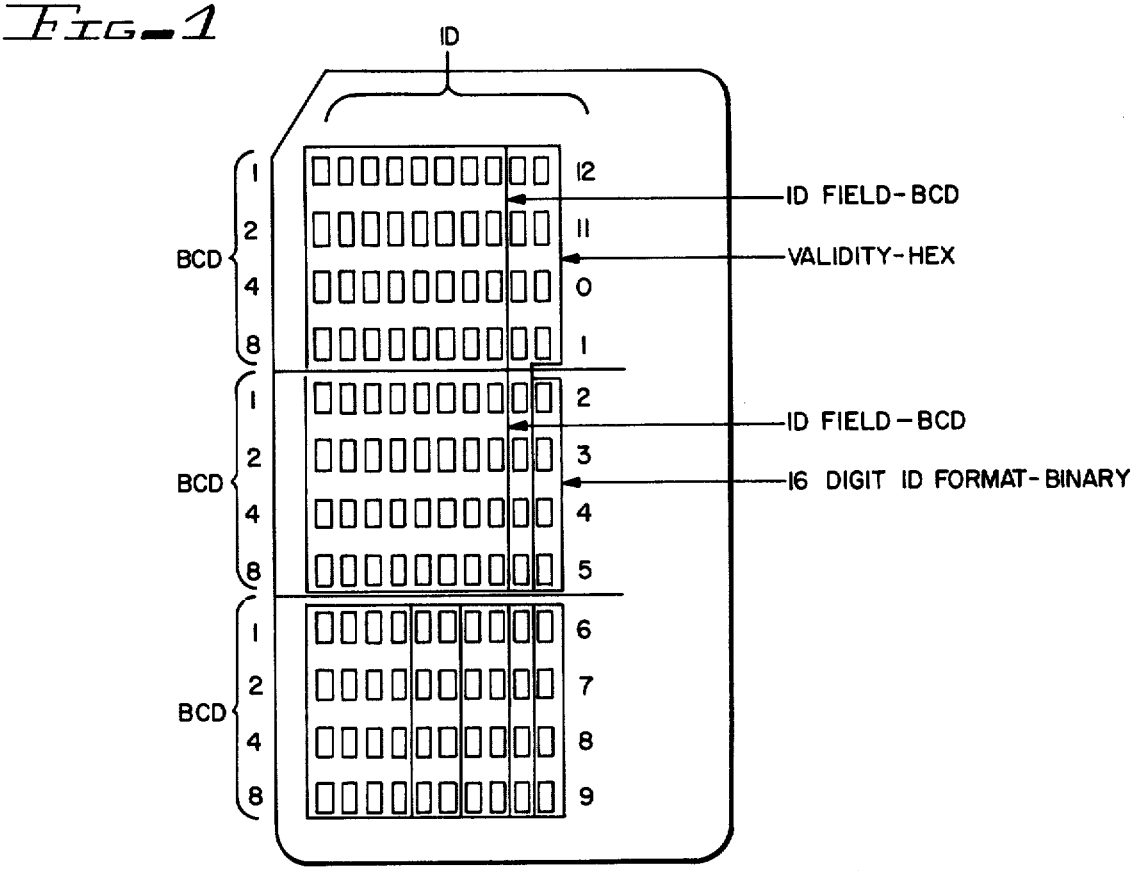

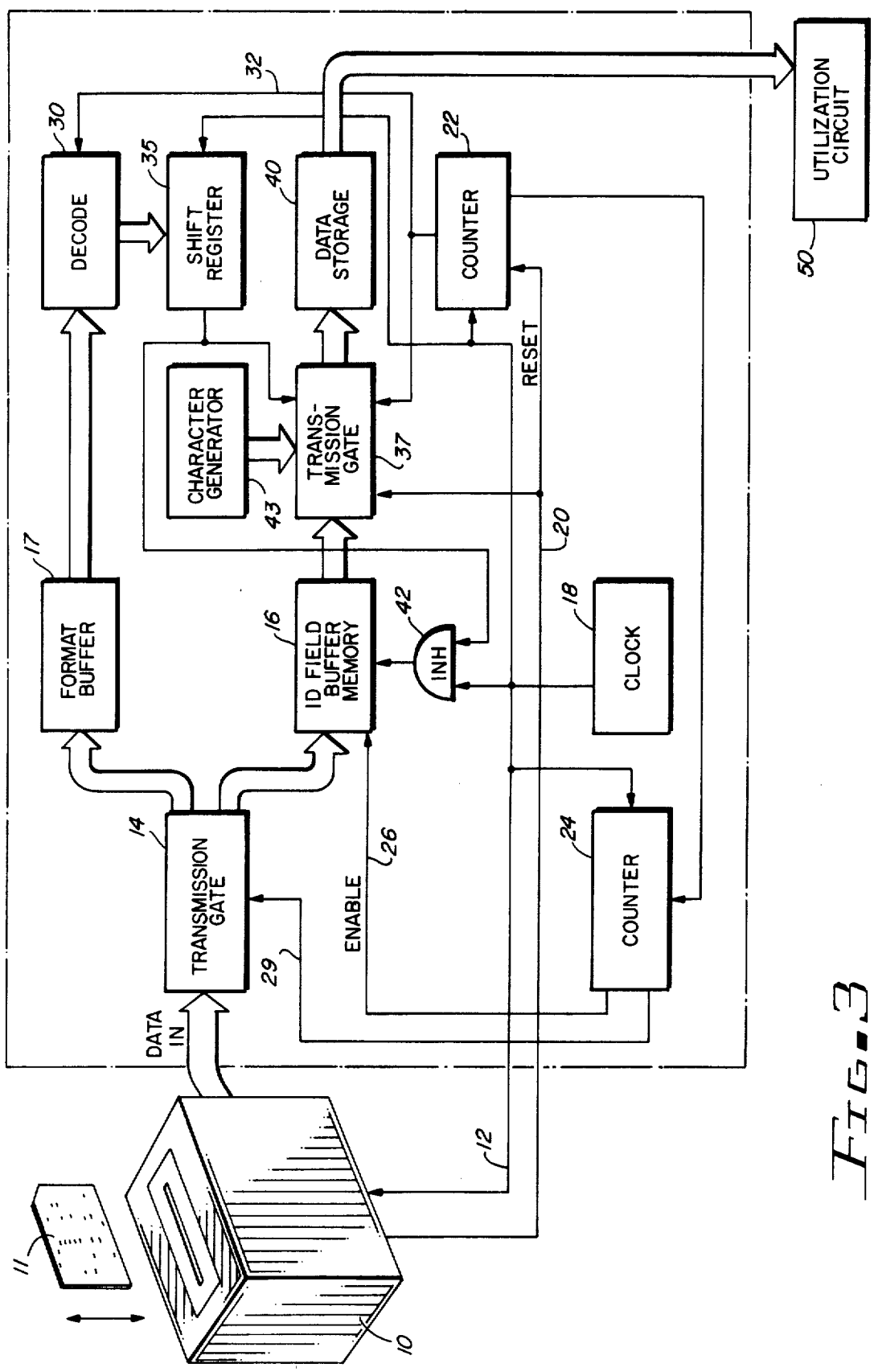

UNIVERSAL DOCUMENT FORMAT SYSTEM

BACKGROUND OF THE INVENTION

Fully automated bank teller systems and self-service fuel dispensing systems have been developed in which a credit card or a specially prepared card document is inserted into a card reader. The selected data on the card then is either locally or remotely processed by a computer for verification of the card identity and various other transactions or routines which may be effected through the use of the card. Such automated systems, both for banking and fuel dispensing systems, may be operated either off-line or in conjunction with a centrally located on-line computer. Various advantages and disadvantages are present with either of these two general types of operation.

Typical systems which employ customer-carried cards for enabling the performance of transactions by such systems are disclosed in the patents to Voss, U.S. Pat. No. 3,845,277, issued Oct. 29, 1974, for a banking system, and the patents to VanNess, number 4,085,313, issued Apr. 18, 1978, and Gentile, U.S. Pat. No. 3,931,497, issued Jan. 6, 1976, for automated fuel dispensing systems. All three of these systems employ a customer-carried portable data entry document or credit card for initiating and controlling operation of the systems with which the card is used.

In conjunction with automatic self-service fuel dispensing systems, the control document or credit card has a variety of data encoded on it. The various characters comprising this data may be encoded by any suitable means, such as magnetic spots, punched holes, or the like.

Unattended automatic self-service fuel dispensing systems primarily are utilized by large trucking companies, large government agencies, or fleet operators of a large number of vehicles, such as taxi cabs. To control the use of such a system and to adequately monitor the quantity and type of fuel dispensed in conjunction with each vehicle and/or driver or user, the cards which are used to control the system carry on them unique identification for each card. This identification may include, depending upon the particular customer requirements, driver and vehicle identity sections, product authorization sections to limit the type of product which may be withdrawn through the use of the card, fuel limit codes and, if a number of different customers use the same fueling station, a master customer identification code. Various other types of data may be encoded on the product authorization credit card or data entry document in accordance with the requirements of the particular system. In almost all systems, however, there is a section on the card which specifically identifies the driver and vehicle; so that the central processing station employed in conjunction with the system can specifically identify the amount of fuel or other products being withdrawn by a particular driver using a specific vehicle. This information is necessary in order to monitor individual operating costs for each vehicle and to monitor individual driver product withdrawal.

In the type of system which is disclosed in the VanNess patent identified above, a single data entry card or credit document is generally sufficient to provide all of the necessary data for each transaction. Some systems, however, require the use of two or more cards with a portion of the data encoded on each different card. The universally accepted size for credit cards which may be readily carried in a billfold or handbag is approximately two and one-eighth inches (2⅛") by three and three-eighths inches (3⅜"). A number of different types of standard card readers are available on the market, but the limitation on the card size obviously limits the amount of data which can be encoded on any card for use with any particular type of reader. Since many systems tax the maximum amount of information which may be encoded on the card, it is desirable to obtain the maximum amount of useful information from the available encoded area for any given system.

For automatic fuel dispensing systems of the type disclosed in the VanNess patent, it has been found that the provision of sixteen (16) characters is an ideal maximum for encoding the driver identification and vehicle identity information. Whenever a customer for a given system does not require the full sixteen (16) character maximum, the custom has been to encode a "space" character at the end of the driver identification section and before the characters comprising the vehicle identification portion of this identification field. It has been found, however, that for customers having a large number of drivers and a large number of vehicles, all sixteen (16) of these characters need to be used for the identification functions. There then is no room for encoding the "space" character between the sections, and the sections simply run together. The software of the computer then is programmed to determine where the split between the driver identification and the vehicle identification section should occur; and in the subsequent processing of the data, an appropriate space or separation character is inserted at the proper place in the information as it is processed. This, however, requires a custom software implementation with the microprocessors used in the system which is unique to the ratio of characters employed by each particular customer for the driver/vehicle identification.

For example, one customer may have an even split between the sixteen (16) digits, that is, eight (8) digits for driver identification and eight (8) digits for vehicle identification. This requires one set of software for the microcomputer. Another customer, however, may use fourteen (14) digits for driver identification and only two (2) digits for vehicle identification. This requires a different software set. The provision of the various software packages for use with systems supplied to different customers has become one of the more expensive items in any automated fuel dispensing system (or in bank card systems). Consequently, it is desirable to eliminate the necessity for providing custom software or custom hardwired circuitry to handle the processing separation for the different portions of the identification field encoded on the data entry cards or documents used in conjunction with the transaction to be performed.

Of general interest with respect to this problem is the patent to Cash et al, U.S. Pat. No. 3,763,467, issued Oct. 2, 1973. The Cash patent is not directed to a system for reading different formats or for automatically formatting a system. Cards used in this system, however, have extra field marks and timing marks along the edge of the card to define the area of the data and to identify the type of data being read on the card. To accomplish this, however, separate read heads are necessary in addition to the various sensors which are employed to sense the data which is encoded on the card.

Accordingly, it is desirable to provide a system for providing format identification, which may be universally used with a single set of software in a microprocessor or with a single hardwired set of system logic, to separate consecutively encoded characters of a fixed length data field into various ratios or sections in accordance with unique identifying indicia or characters encoded on the card to expand the amount of useful identification information which may be encoded on the card and to permit universal operation of a variety of formats with a single processing system.

SUMMARY OF THE INVENTION

Accordingly, it is an object of this invention to provide an improved document controlled utilization system.

It is another object of this invention to provide an improved variable format document controlled system.

It is an additional object of this invention to provide a system for controlling the format of at least a portion of the data entered into the system in response to a unique format code included as part of that data.

It is a further object of this invention to provide an improved universal variable format document controlled utilization system.

In accordance with a preferred embodiment of this invention, a document controlled utilization system is operated in conjunction with encoded data entry documents. These documents have a format code encoded in them in a predetermined position. A document reader reads the data from the documents and supplies it to a data processing section which, in turn, applies the data to the utilization circuit. The data processing section responds to the reading of the format code by the reader to control the format of at least a portion of the remainder of the data which is read from the documents by the document reader prior to its application to the utilization circuit.

BRIEF DESCRIPTION OF THE DRAWINGS

FIG. 1 is a view of a data entry card for use with the system of a preferred embodiment of the invention;

FIG. 2 is a table useful in explaining the operation of a preferred embodiment of the invention; and FIG. 3 is a block diagram of a system for use in conjunction with the card shown in FIG. 1.

DETAILED DESCRIPTION

Reference now should be made to the drawings in which the same reference numbers are used in the different Figures to designate the same or similar components. FIG. 1 is an enlarged view of a typical encoded document for use with an automated dispensing system in accordance with this invention. The document is in the form of an encoded rigid plastic card of standard credit card size. This card then is used in conjunction with a commercial card reader of the type described in the VanNess patent, mentioned above, to initiate and control the fuel dispensing transaction disclosed in that patent, or a similar card controlled transaction.

The card, as shown in FIG. 1, may be variably encoded with binary data arranged in ten (10) vertical columns and twelve (12) rows, as the orientation of the card is shown in FIG. 1. Various types of binary coded characters may be used for typical systems; but it has been found that for most card controlled transactions, encoding the variable characters in BCD (binary coded decimal) code gives sufficient character variations. This is a preferred code but, obviously, other codes using different numbers of bits per character may be employed if desired.

As shown in FIG. 1, the variable data is arranged into three (3) groups of BCD characters. The characters are encoded with the four (4) bits of each character aligned vertically in the same row. Thus, for the twelve (12) rows of variable data shown on the card in FIG. 1, three (3) different horizonal groups of BCD characters are possible. These groups are bracketed for the characters within each group as shown on the left-hand side of the card of FIG. 1. There are ten (10) characters in each of the three (3) groups, and the data within the character fields for these groups is utilized for different purposes.

For a typical card used to control an automated fuel dispensing system, the eight (8) characters on the left-hand side of the upper two (2) groups comprise the characters used for the identification field. This field includes the driver and vehicle identification and, in some cases, may include a customer identification as well. In the upper group of ten four-bit BDC characters, the two right-hand characters (as viewed in FIG. 1) typically are used as validity check characters and are encoded in hexadecimal code. Similarly, the middle group of characters has the character in the ninth column of the card included in the validity check hexadecimal code along with the two characters from the upper group; so that a three character validity check code is utilized.

The single right-hand character of the center group of characters is shown identified in FIG. 1 as an ID (identification) format binary code. This character is encoded in BCD code and is utilized in accordance with this invention to control the format of the subsequent processing of the sixteen identification field characters found in the left-hand eight columns of the upper two groups of BCD characters shown on the card in FIG. 1.

The lower-most group of ten BCD characters, when the card is used in conjunction with a system of the type shown in the VanNess patent described above, typically includes a group of characters for the "lockout" control function, a group of characters for product identification, another group for controlling the fuel limit, and, generally, one or two characters comprising parity-check characters for the card. The data which is encoded in this section of the card, however, may be varied in accordance with the particular requirements of the system with which it is used; and no further discussion of this portion of the data on the card will be entered into here.

The operation of the single identification format binary character, however, found in column 10 of the center group of characters following the identification character fields is illustrated more fully in the table shown in FIG. 2. As mentioned above, this character is encoded in binary code, which provides a total of sixteen (16) different possible variations of the four binary bits used to comprise the character. Each of these binary bits is utilized in the system to control a different format or arrangement of the sixteen characters in the upper and middle groups of characters used for the identification field data encoded onto the card to uniquely identify that card with a particular driver, vehicle (and possibly in addition, customer). This format control character is utilized only when all sixteen of the characters in the identification field are required for the identification field function. If a lesser number of characters is required, the formatting of the identification field may be encoded directly in the field by encoding "space" characters or other suitable separation characters between the different portions of the identification field.

The necessity for providing the format character, however, arises due to the relatively large number of variations in the size or length of the different segments of the identification fields required by different customers. For some customers a relatively large number of driver identification codes are required, with a relatively small number of vehicle identification codes, or vice-versa. It is necessary for any system operating with such a card to be able to adapt economically and readily to such variations. In the past, when a system was dedicated to a single customer, the wiring between the various components used in the system or the software programming for the system was specifically tailored to accomodate the specific code format required by that customer. A different customer with a different format requirement needed to have a different software package or a different hard-wired hardware package if a dedicated system not using a microprocessor was used for that particular customer. These alternatives, however, required substantial custom manufacturing by the producer of the systems, which increased their costs.

In FIG. 2, the binary code for the format character of a universal automated card controlled utilization system, such as a fuel dispensing system, is shown along with the particular format which is indicated by each of the various codes shown in the left-hand column of FIG. 2.

As shown in FIG. 2, only fourteen of the possible sixteen combinations of the identification code format are illustrated. These fourteen are used in a commercial embodiment of the system which did not require the full sixteen possible combinations. The other two combinations obviously could be assigned to provide different formats not included among those shown in the table in FIG. 2. For each of the different binary codes into which the format code may be encoded, the representation of the format of the sixteen digits of the identification field is shown to the right of this code in the table.

In the table, a typical division is in the form of two different sections or three different sections, each having a different number of characters or digits in them. These different combinations are illustrated as including a "space" character between the number of digits or characters in each different sectionalized combination. Thus, if the format code is encoded as a binary BCD number "4", reference to the table in FIG. 2 shows that the number of characters or digits in the first identification portion of the identification field is eleven characters, and the number in the second portion, separated by a space, is five characters. Thus, the driver identification, for example, could include eleven different characters for all of the different possible combinations of driver identification, while the vehicle identification comprises five different uniquely encoded characters to identify the various vehicles which may be included for this particular customer using the system. This can be expanded into a division of the sixteen characters of the identification field into three different groups. For example, if the format code is encoded as a BCD number "11", a three section division is shown in the table of FIG. 2. The first portion of the field includes seven characters (which may be driver identification), separated by a space, followed by six characters (which may be vehicle identification), followed by a space, with the final portion of the identification field comprising three characters. These latter three characters may be used to uniquely identify a particular customer or some other characteristic of a single customer in conjunction with the other two portions of the formatted field. It is readily apparent from an examination of the chart in FIG. 2 that the use of the formatting code permits a significant expansion of the arrangement of the data which is encoded in the identification field when all sixteen characters of the identification field must be used for the encoding of the necessary variably encoded identification information.

Reference now should be made to FIG. 3 which illustrates a hard-wired version of a portion of the system operated in response to the encoding shown on the card in FIG. 1 to produce the format variations illustrated in the table of FIG. 2. The system shown in FIG. 3 may be used in conjunction with and be a part of the system shown, for example, in the VanNess patent, U.S. Pat. No. 4,085,313, described above. The specification of the VanNess patent is incorporated herein by reference, and the system which has been described in that patent will not be described in any further detail here.

A card reader 10, which may be a conventional photoelectric or magnetic card reader, adapted to read cards encoded in accordance with the format shown on the card of FIG. 1, is employed as the data input device for the system. A card 11, which is encoded as shown in FIG. 1, is inserted into the reader 10 to initiate and control the transaction for the remainder of the system. Typically, the system is of the type disclosed in the VanNess patent. The data read from the card reader 10 is controlled in conjunction with clock pulses applied to the reader over a lead 12. These pulses are generated in the microprocessor or logic of the remainder of the system to coordinate the reading of the data on the card with the operation of the rest of the system.

As shown in FIG. 3, the data read on the card is applied in parallel on a character-by-character basis to a transmission gate 14. The transmission gate 14 is operated to supply this information, on a parallel character-by-character basis, to one or the other of two outputs connected, respectively, to an identification field buffer memory 16, or a format buffer 17. Initially, assume that the transmission gate 14 is set to transfer the data applied to its input through the gate to the identification field buffer memory 16. This means that the characters of the identification field (the sixteen character field discussed above) are applied to the buffer memory 16 on a character-by-character basis for storage therein. This storage is effected under control of a clock 18, which also supplies the timing pulses over the lead 12 to the reader 10.

At the beginning of the operation for reading a new card, a reset pulse is applied over a lead 20 to a counter 22 in the control logic for the utilization system to reset that counter to an initial count. A counter 24 previously has been set to an initial or zero count by the operation of the counter 22, and the counter 24 continues to operate in conjunction with the output of the clock pulses applied from the clock 18, along with the counter 22, the buffer memory 16, and the reader 10. Each pulse from the clock 18 advances the counter 24 by one count. Since the counter initially has been placed in its zero or reset mode of operation, a pulse is applied over an enable lead 26 to enable the buffer memory 16 to receive the data applied to it from the transmission gate 14. After the counter 24 attains a preestablished maximum count (16 if no validity check is made, or 19 if the hexadecimal validity check fields are used in the system), the transmission gate 14 is operated by a pulse applied over an output lead 29 from the counter 24 to shift its outputs from the buffer memory 16 to the format buffer 17. The next character read then is the identification format character, which has one of the various binary code combinations shown in the left-hand column of FIG. 2 encoded in it. This character is applied to the format buffer 17, the output of which is connected to a character decoding circuit 30.

At this point, an output pulse is applied over a lead 32 from the counter 22 to cause the decoder circuit 30 to supply a parallel output indicative of the decoded binary code of the identification format character to a shift register 35. This character, uniquely representative of one of the sixteen possible combinations which may be encoded into the ID format code, is represented by the information stored in the shift register 35. The register 35 is advanced sequentially by pulses obtained from the output of the counter 22 to shift the unique signal information in the shift register to its output to operate a transmission gate 37, connected between the output of the buffer memory 16 and the input of a data storage memory 40.

During the time that the information is being stored into the buffer memory 16, the transmission gate 37 is disabled from supplying any output signals from its output. This is effected by the reset pulse applied over the lead 20 which is used to reset the counter 22. This pulse also is applied to the transmission gate 37 to disable or reset the transmission gate. When the output pulse is obtained from the output of the counter 22 to store the information in the shift register 35, this same output pulse also is coupled to the transmission gate 37 to enable the gate 37 to pass characters through it to the data storage circuit 40.

Until a pulse is received from the output of the shift register to the transmission gate 37, indicative of the format location of the "space" characters to be inserted into the identification field data passed through the transmission gate 37 to the data storage 40, the field characters which are stored in the buffer memory 16 are transferred character-by-character under control of the clock pulses applied through the inhibit gate 42 to the transmission gate 37 and through it to the data storage circuit 40. Whenever a pulse is shifted through the shift register 35, however, indicative of the position in the identification field where a "space" or other separation character is to be inserted into the identification field data, this pulse inhibits the passage of a clock pulse by blocking the inhibit gate 42; so that the identification field buffer memory 16 is not advanced in response to that particular clock pulse. At the same time, the output of the shift register 35 operates the transmission gate 37 to cause a character generated by a character generator circuit 43 to be passed through the transmission gate 37 to the data storage memory 40. In the illustration of the system which has been given, this character is generated as a BCD encoded "space" character, and it is supplied through the gate 37 to the data storage memory 40 in the proper position for the decoded format code which was used to place the pulse representative of this position in the proper location in the shift register 35 at the time the transfer of information was made, as described above.

The shifting of data through the shift register 35 continues, and the transmission gate 47 reverts back to its original state of operation in response to the application of the next clock pulse to the shift register 35. At the same time, the inhibit input to the inhibit gate 42 is removed; so that the clock pulses for advancing the data out of the buffer memory 16 through the gate 37 may resume. This operation continues until all of the data comprising the identification field (that is, all sixteen characters) have been transferred to the data storage circuit 40, along with the inserted "space" characters supplied through the transmission gate 37 from the character generator 43 in response to the output of the shift register 35. Once this has been effected, the information in the data storage circuit 40 may be supplied to the utilization circuit 50, which is representative of the remainder of the operating portion of the system, such as shown in the VanNess patent, for controlling the dispensing of products, operation of automatic tellers, or the like for which the system is designed.

After all of the identification field data has been properly passed through the system and stored in the data storage memory circuit 40, the final or full count of the counter 22 has been reached and it applies a reset pulse to the counter 24. The shift register 35 applies an inhibit output to the gate 42 and no further operation of this portion of the system takes place until the insertion of a new card in the reader 10. When a new card is inserted, the foregoing sequence of operation is repeated. If the new card has a different format code encoded in it from the code which was encoded for the previous card, the system automatically operates through the decoding circuit 30 to cause the proper format of data to be transferred to the data storage circuit 40 in accordance with the format code. The various formats are shown in FIG. 2.

It should be noted that while the foregoing description has been made in conjunction with the "hard-wired" system logic shown in FIG. 3, typical applications utilize a microprocessor with the format encoding function implemented by means of a single set of software responsive to the format code. A universal software program may be used to cause the microprocessor to operate in the same manner described above in conjunction with the operation of the circuit shown in FIG. 3. Implementation of the system, either through software or through a hard-wired configuration as described above, may be employed. The portion of the circuit which is enclosed in dotted lines in FIG. 3 is used to effect the proper identification field formatting and is in conjunction with and in addition to the remainder of the system of the utilization circuit 50, which may comprise a system of the type disclosed in the VanNess patent, or other types of card actuated utilization systems for a variety of applications.

The foregoing description is to be considered illustrative only of the features of the invention. Various changes and modifications will occur to those skilled in the art without departing from the scope of the invention. Obviously, the number or characters and the arrangement of characters used on the data entry card may be varied. The size of the card or implementation of the system operation by means of multiple cards for any given transaction may be employed. In addition, various arrangements of circuitry to accomplish the format function will occur to those skilled in the art without departing from the true scope of the invention.

I claim:

1. A document controlled utilization system for use with encoded data entry documents having a predetermined number of data characters located thereon in a fixed location with the data characters representing at least two different groups of information characters and having a format code character encoded therein in a predetermined position, said format code character signifying which data characters are in each of such groups, said system including in combination;

document reading means for reading said data characters and said format code character from documents inserted therein;

utilization means for utilizing data encoded on said data entry documents and read by said document reading means and responsive to the data in each of said groups of data characters;

data processing means coupled with said document reading means for receiving data read thereby and including means responsive to the reading of said format code character by said document reading means for inserting a predetermined character in a predetermined location between two of said data characters to establish those data characters in each of said two groups of information characters, said predetermined location of said predetermined character being variable in accordance with the encoding of said format code character; and means for supplying said data with said inserted predetermined character therein from said data processing means to said utilization means.

2. The combination according to claim 1 wherein said data entry documents each comprise a rigid encoded card having a fixed number of multi-bit data characters encoded therein, with said format code character comprising at least one multi-bit character physically located in a predetermined position on said card.

3. The combination according to claim 1 wherein said predetermined character is a character recognized by said utilization means as a separation between different groups of characters in the data read by said document reading means from such card inserted therein.

* * * * *